Patented Aug. 27, 1940

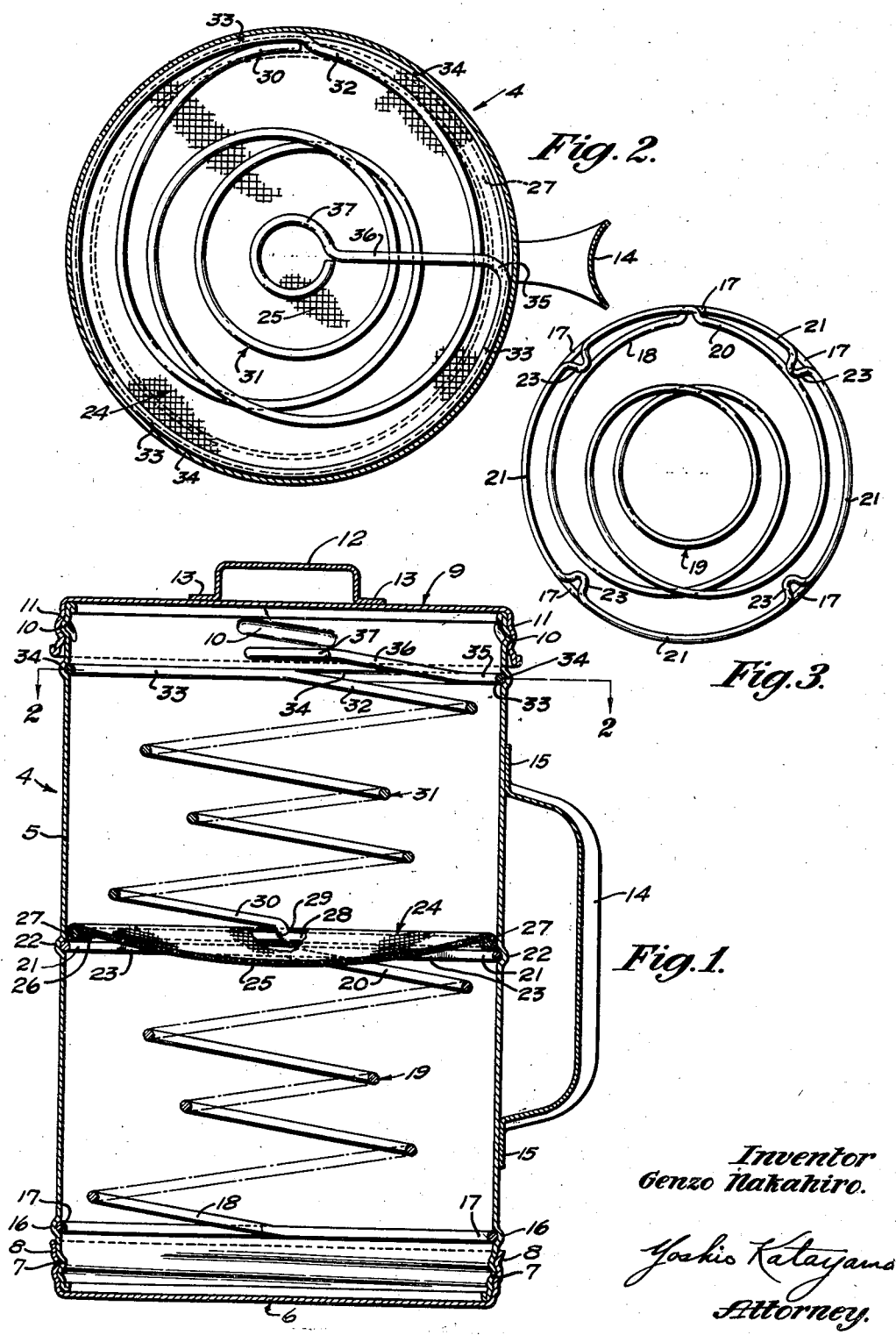

2,212,788

UNITED STATES PATENT OFFICE 2,212,788

FLOUR SIFTER

Genzo Nakahiro, San Francisco, Calif.

Application January 13, 1940, Serial No. 313,785

7 Claims. (Cl. 209—251)

This invention relates to new and useful improvements in flour sifters. In the baking art, it is well known that the more the flour is sifted and stirred, the lighter will be the bread and cakes made therefrom, as more air will be distributed through the flour which will expand in baking and result in a lighter baked product.

An object of the invention is to provide an improved means whereby the flour can be moved through the screen a number of times with the result that it will be thoroughly permeated with air before it is prepared for baking.

A further object is to provide a device of the character stated, which is capable of a wide variety of uses, and which will most efficiently perform the functions for which it is intended.

With these and other objects in view, the invention consists in certain novel features of construction and combinations and arrangements of parts, as will be more fully hereinafter described and pointed out in the claims.

In the accompanying drawing:

Figure 1 is a view in vertical section illustrating my improved sifter device;

Figure 2 is a transverse sectional view along line 2—2 of Figure 1, and

Figure 3 is a plan view of the spiral coil wire used in the lower compartment of the sifter.

Referring now more specifically to the drawing wherein like reference numerals designate similar parts in each of the figures, the numeral 4 refers to a receptacle, having an outside wall 5 usually constructed of tinned sheet metal, although wood or bamboo may be used, and it is substantially cylindrical in form.

At the lower end of the receptacle there is a screw cap 6 having a flat surface for its base. The inner threads 7 of the receptacle wall 5 co-operating with the outer threads 8 on the flange of the cap 6. The numeral 9 designates a top or lid for the flour sifter having threads 11 coacting with the threads 10 on the receptacle 5 as commonly found in mayonnaise jar caps. A handle 12 is attached to the lid by the shoulders 13. A handle 14 is positioned parallel with the casing 5 and connected to the casing by shoulders 15.

The receptacle comprises two sections, upper and lower. In the lower section there is a circular groove 16 on the receptacle wall 5. A spiral coil 1 is placed within the lower portion of said receptacle. The spiral wire coil is flexible in nature having a circular loop 17 which snugly fits in groove 16. The spring of the wire coil will tend to hold it in place. The coil is helical and has loops 18, 19 and 20, the purpose of which will be explained in detail later. The upper end of the coil is formed with a circular loop 21 which is constructed with indentations 23. This offers a seat for the screen 24 and the circular wire loop 27. The groove 22 midway between the top and bottom accommodates the loop 21.

The screen or sieve 24 having a loose concave surface 25 preferably a wire fabric is attached to lower loop 27 of the upper wire coil 28 by any suitable means. After one complete circular loop 27, the coil 28 is brought upward at an angle 29 and coiled helically into a spiral with turns 30, 31 and 32. The upper extremity of the said coil is formed into a resilient circular loop 33 fitting snugly into the groove 34 of the receptacle 5. Circular loop 33 is brought in radially as shown by 35, and is extended inward as shown by 36 into the center of said receptacle. A small circular loop is arranged at the end thereof to facilitate the removal and placing of screen 24.

While of course, my improved device is capable of many different operations, I will describe the ordinary operations as follows:

The flour is placed in the upper compartment and the top placed thereon. Movement of the hand through handle 14 will cause the flour to sift through the screen 24 into the lower compartment. The completely sealed container will not allow any particles of flour or flour dust to become dispersed outside the container. The spiral coil functions as an agitator and thoroughly permeates the flour with air. This maintains the sifted flour in a fluffy form instead of allowing it to settle into a solid mass. When all the flour has passed through the screen, the position of the receptacle is reversed so that top 12 will serve as the bottom and the flour is sifted back through the screen. This process may be continued as long as desired. The top 12 may be removed and the screen 24 which will probably contain many large particles and lumps may be removed.

As an alternate form, where only one operation is sufficient, the bottom 6 may be removed. The flour is placed in upper portion of the receptacle and shaken. The flour will gradually sift through the screen and fall into a pan or receptacle over which the sieve or sifter is held.

It is to be observed that each part of this device is detachable from the other parts, and in case one part should become worn or broken, a new part may be readily substituted therefor without discarding the entire utensil.

I do not limit myself to the precise details set forth but consider myself at liberty to make such changes and alterations as fairly fall within the spirit and scope of the appended claims.

What I claim is:

1. A flour sifter comprising a casing having a handle, a removable bottom and a removable top, an agitating coil removably held in said casing, said coil having convolutions spaced over a material portion of the casing for breaking up and impeding the free fall of the flour therethrough, and a screen having a frame supported on said coil transversely of the casing.

2. A flour sifter comprising a casing having a handle, a removable bottom and a removable top, an agitating coil removably held in said casing, said coil having convolutions spaced over a material portion of the casing for breaking up and impeding the free fall of the flour therethrough, supporting means extending inwardly from said coil and a transverse screen having a frame held on said supporting means.

3. A flour sifter comprising a casing having a handle, a removable bottom and a removable top, an agitating coil removably held in said casing, said coil having convolutions spaced over a material portion of the casing for breaking up and impeding the free fall of the flour therethrough, a second agitating coil having its terminal loop in a plane, a screen on said loop and means in said casing for holding said second coil with its loop and screen on said first named coil.

4. A flour sifter comprising a casing having a handle, a removable bottom and a removable top, a helical agitating coil having one end removably held at a mid point of the casing and its opposite end held near an end of the casing, a second helical agitating coil having its terminal loop in a plane, a screen on said loop and means in the second end of the casing for holding said second coil with its terminal loop and screen on said first named coil.

5. A screen member for a flour sifter comprising a helical wire coil having its terminal loop in a plane, a screen having its peripheral edges attached to said loop, a freely resilient loop at the opposite end of the coil and a radial extension on the resilient loop.

6. In combination, a cylindrical casing and transverse screen for a flour sifter, an agitator comprising a helical coil having one terminal loop engaging the inner wall of said casing, intermediate turns of varying lesser diameters and a second terminal loop of the same diameter as the first named one engaging the inner wall of said casing spaced from said first named loop.

7. In combination, a cylindrical casing and transverse screen for a flour sifter, and agitator comprising a helical coil having one terminal loop engaging the inner wall of said casing, intermediate turns of varying lesser diameters and a second terminal loop of the same diameter as the first named one engaging the inner wall of said casing spaced from said first named loop, said second terminal loop having an inwardly directed radial extension.

GENZO NAKAHIRO.